Dec. 18, 1923.
B. F. SEYMOUR
1,477,910
RESILIENT TRANSMISSION AND BEARING
Filed June 7, 1919    2 Sheets-Sheet 1
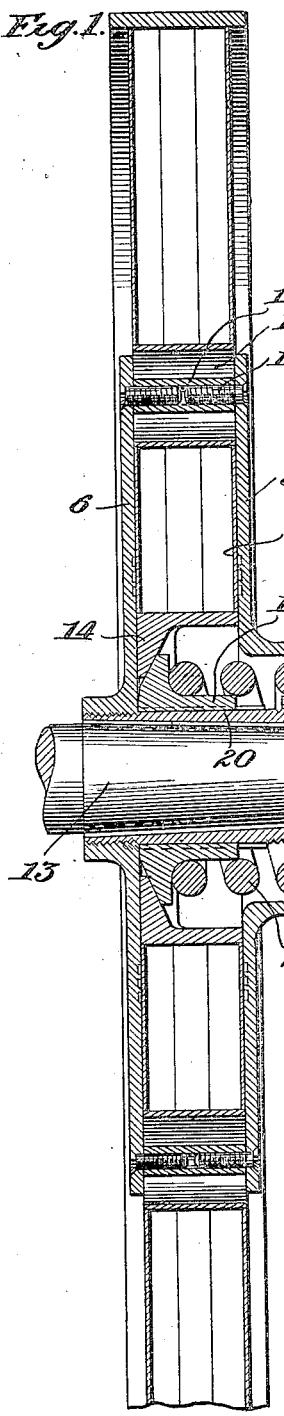
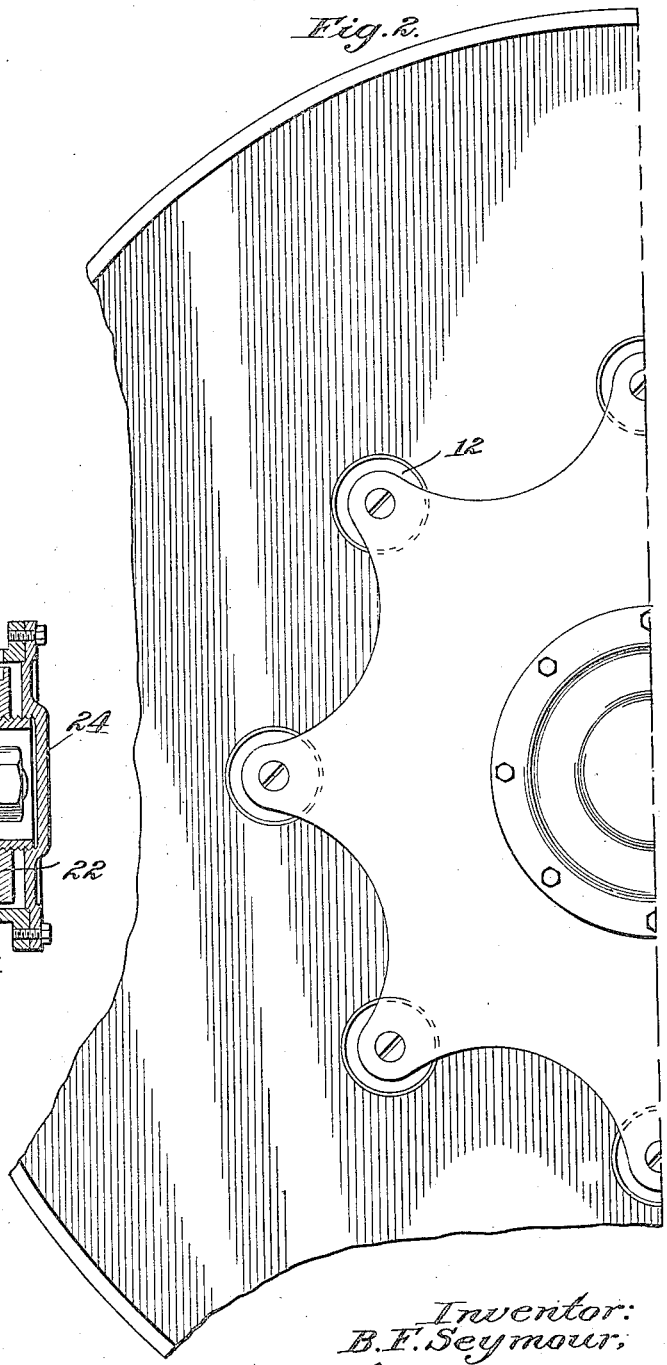
Inventor:
B. F. Seymour,
Atty.

Dec. 18, 1923. 1,477,910
B. F. SEYMOUR
RESILIENT TRANSMISSION AND BEARING
Filed June 7, 1919 2 Sheets-Sheet 2
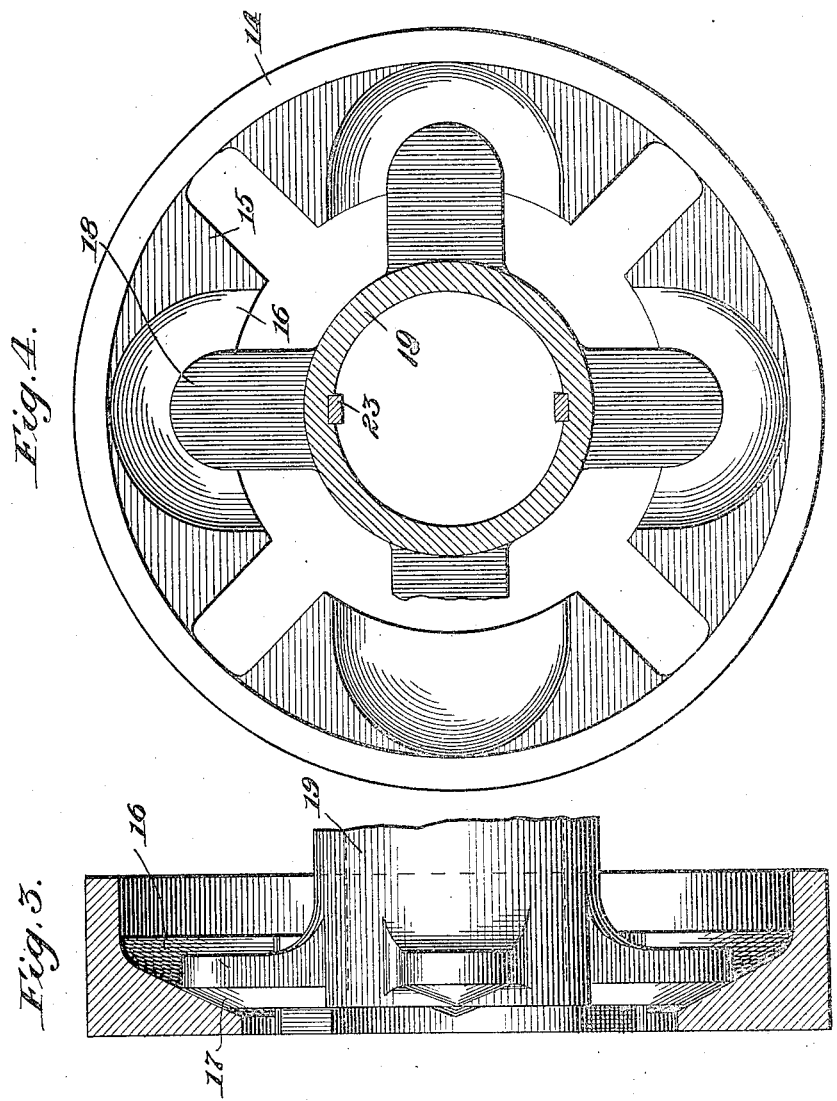

Patented Dec. 18, 1923.

1,477,910

UNITED STATES PATENT OFFICE.

BENJAMIN F. SEYMOUR, OF WASHINGTON, DISTRICT OF COLUMBIA.

RESILIENT TRANSMISSION AND BEARING.

Application filed June 7, 1919. Serial No. 302,416.

*To all whom it may concern:*

Be it known that I, BENJAMIN F. SEYMOUR, a citizen of the United States, residing at Washington, in the District of Columbia, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The invention is shown by way of illustration in the accompanying drawings wherein, Figure 1 is a central sectional view showing the application of the device to vehicle wheel, Figure 2, a side elevational view thereof, Figure 3, an enlarged detail view, partly in section, of the transmitting and bearing elements per se, and Figure 4 is a similar view thereof taken at right angles to Figure 3.

Referring to the construction in further details and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 that screw into threaded sleeves 11 that serve as spacing elements and which are located within the spaces, or chambers, 12, as indicated in Figures 1 and 2. It will be understood of course that said spaces 12 are provided to allow the wheel rim to have limited radial movement with respect to the axle 13 of the wheel.

The resilient transmission and bearing device per se consists of an inwardly disposed flange 14 formed on the rim portion 9, and constructed to provide a plurality of centrally disposed segmental sections 15 (see Figures 3 and 4). The several segmental portions 15 are each cut away on one face, as at 16, to provide recessed and segmental cam surfaces that cooperate with the segmental elements or heads 17 formed on the several dogs 18. Said dogs 18 are formed integral with the sleeve 19 to have sliding movement on the hub part 20 as the aforesaid cam elements co-act. By having the cone elements in the form of segments the maximum strength of the wheel rim and hub portions of the wheel are retained.

The sleeve 19 carrying the dogs 18 is held in operative position and under the required tension by the spring 21 which seats against said dogs and the collar 22 which is adjustable on the hub part 20, as shown.

Said sleeve 19 is prevented from having angular movement on the member 20 by the keys 23 fitting in key-ways formed in said sleeve and the member 20 as shown. And the removable closure plate 24 radially permits access to be had for adjusting said collar 22 to regulate the tension of the spring 21, as will be understood.

It will be seen from the foregoing that any portion of the shaft or axle 13 will transmit a like movement of the wheel hub through the medium of the dogs and that such transmission will be flexible or resilient in nature. And it will be further seen that any jarring motion imparted to the wheel will be resiliently taken up by the cooperating cam elements together with the spring.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

I claim—

1. In a combined resilient bearing and transmission for vehicle wheels the combination of a hub member, a wheel rim mounted to have limited radial movement on the hub member, a sleeve mounted to have axial movement on said hub member, said sleeve and wheel rim having respectively a plurality of cooperable and annularly arranged segmental cone elements, and a spring carried by the sleeve normally holding said cone elements in engagement and providing the bearing and drive, substantially as set forth.

2. In a combined resilient bearing and transmission for vehicle wheels the combination of a hub member, a wheel rim mounted to have limited radial movement thereon, said rim having a plurality of annularly arranged segmental cone elements on one side thereof, a sleeve member axially movable on the hub and having annularly arranged segmental cone elements engaging the cone elements of said rim, and a spring normally holding said cone elements in engagement and providing the bearing and drive, substantially as set forth.

3. In a combined resilient bearing and transmission for vehicle wheels the combination of a hub member having side plates, a rim member mounted to have limited radial movement between said side plates, said rim having a portion disposed against one side plate and provided with a plurality of segmental cone recesses, a sleeve member slidable on the hub and provided with a plurality of segmental cone heads engaging the cone recesses of said rim, a spring normally holding said cone elements in engagement, and means for tensioning said spring, substantially as set forth.

In testimony whereof I affix my signature.

BENJAMIN F. SEYMOUR.